(12) United States Patent
Neet

(10) Patent No.: US 12,132,369 B2
(45) Date of Patent: Oct. 29, 2024

(54) WINDING WITH PARALLEL WIRES AND QUAD SECTIONS

(71) Applicant: BorgWarner Inc., Auburn Hills, MI (US)

(72) Inventor: Kirk Neet, Noblesville, IN (US)

(73) Assignee: BorgWarner Inc., Auburn Hills, MI (US)

( * ) Notice: Subject to any disclaimer, the term of this patent is extended or adjusted under 35 U.S.C. 154(b) by 337 days.

(21) Appl. No.: 17/833,368

(22) Filed: Jun. 6, 2022

(65) Prior Publication Data

US 2023/0396112 A1 Dec. 7, 2023

(51) Int. Cl.
*H02K 3/28* (2006.01)
*H02K 1/16* (2006.01)
*H02K 3/12* (2006.01)

(52) U.S. Cl.
CPC ............... *H02K 3/28* (2013.01); *H02K 1/16* (2013.01); *H02K 3/12* (2013.01); *H02K 2213/03* (2013.01)

(58) Field of Classification Search
CPC .. H02K 3/28; H02K 1/16; H02K 3/12; H02K 2213/03
See application file for complete search history.

(56) References Cited

U.S. PATENT DOCUMENTS

| | | | |
|---|---|---|---|
| 7,005,772 B1 * | 2/2006 | Frederick | H02K 3/12 310/179 |
| 7,034,428 B2 | 4/2006 | Cai et al. | |
| 2018/0034335 A1 | 2/2018 | Neet et al. | |
| 2020/0244126 A1 * | 7/2020 | Neet | B60K 6/485 |

* cited by examiner

*Primary Examiner* — Mohamad A Musleh
(74) *Attorney, Agent, or Firm* — Maginot, Moore & Beck, LLP

(57) ABSTRACT

An electric machine includes a stator core and a multi-phase winding. The stator core includes a plurality of teeth defining a number of slots in the stator core. The multi-phase winding is positioned on the stator core and defines a number of poles, a plurality of parallel paths per phase, and a number of pole-turns for each parallel path. The number of pole-turns for each parallel path divided by the number of poles is a mixed number.

20 Claims, 3 Drawing Sheets

WINDING WITH PARALLEL WIRES AND QUAD SECTIONS

FIELD

The present disclosure relates to the field of electric machines, and more particularly, stator winding arrangements.

BACKGROUND

Stator windings are provided in various configurations with different features that provide different performance characteristics for the electric machine. Examples of different winding features include the number of poles, number of phases, number of slots-per-pol-per-phase, conductor type, number of conductor layers, number of parallel paths per phase, number of pole-turns, and types of connections between conductors, as well as any of numerous additional winding features.

Stator windings may be formed using different methods. For example, stator windings may be formed from wire strands that are continuously wound on the stator core or formed from a plurality segmented conductors that are connected together on the stator core. A segmented conductor includes two straight segments connected by an end loop. Accordingly, segmented conductors are sometimes referred to as "hairpin conductors" or "U-turn conductors." In order to form a winding with segmented conductors, the segmented conductors are inserted axially into the slots of a stator core, the ends of the conductors are twisted, and the terminal portions of the leg ends are then connected together to form paths for the winding.

Segmented conductors are particularly advantageous when special connections between conductors are required in order to complete the winding. Segmented conductors come in a number of different configurations, including differently sized conductors, and conductors with different pitches defined by the end turn loop (i.e., the distance between the straight segments of such conductors). Segmented conductors may be used to form any number of different winding arrangements based on the size and shape of the segmented conductors and the connections made between the segmented conductors.

In view of the ability to form different winding arrangements with different performance characteristics, it would be advantageous to provide an electric machine with a winding arrangement defined by multiple parallel paths, multiple wraps around pole sections, and each section of the path connected in series. Additionally, it would be advantageous if such winding arrangement included unique performance characteristics and could be manufactured and produced with relative simplicity without the need for significant cost increases over other segmented winding arrangements. These features and advantages for an electric machine, as well as others, will become more readily apparent to those of ordinary skill in the art by reference to the following detailed description and accompanying drawings. While it would be desirable to provide an electric machine with a segmented conductor winding arrangement that provides one or more of these or other advantageous features as may be apparent to those reviewing this disclosure, the teachings disclosed herein extend to those embodiments which fall within the scope of the appended claims, regardless of whether they include or accomplish one or more of the advantages or features mentioned herein.

SUMMARY

In at least one embodiment disclosed herein, a stator for an electric machine includes a stator core having a plurality of teeth defining a plurality of slots in the stator core. The stator further includes a winding positioned on the stator core. The winding is comprised of a plurality of segmented conductors connected together to provide a plurality of parallel paths per phase for the winding, each conductor comprising (i) an end loop provided on a crown end of the stator core, (ii) two legs extending through the slots of the stator core, and (iii) two leg ends extending out of the slots on a connection end of the stator core, each leg end having a twist portion. The winding defines a number of poles, a number of parallel paths per phase, a number of layers in each of the plurality of slots, and a number of pole-turns. The number of pole-turns is not evenly divisible by the number of poles. As explained in further detail herein, the number of pole-turns is defined herein as the number of legs of one parallel path divided by two. For example, as explained in further detail herein in association with FIG. 3, each parallel path (e.g., path "C") has thirty-two (32) legs and therefore the number of pole-turns is sixteen (16).

In at least one embodiment disclosed herein, an electric machine includes a stator core and a multi-phase winding. The stator core includes a plurality of teeth defining a number of slots in the stator core. The multi-phase winding is positioned on the stator core and defines a number of poles, a plurality of parallel paths per phase, and a number of pole-turns for each parallel path. The number of pole-turns for each parallel path divided by the number of poles is a mixed number.

In at least one embodiment disclosed herein, a stator for an electric machine includes a stator core with a winding positioned on the stator core. The stator core has a plurality of teeth defining a number of slots in the stator core. The winding is comprised of a plurality of conductors connected together to provide a plurality of parallel paths per phase for the winding. Each parallel path of the winding defines a first coil and a second coil associated with a first pair of poles, and a third coil and a fourth coil associated with a second pair of poles. The winding also defines a number of poles and a number of pole-turns, wherein the number of pole-turns is not evenly divisible by the number of poles.

DESCRIPTION

A stator for an electric machine is disclosed herein. The stator includes a stator core with a winding formed thereon. The winding includes conductors arranged in layers in slots of the stator core. The conductors are arranged such that the winding includes a plurality of phases and a plurality of parallel paths per phase with the conductors form a plurality of coils on the stator core. The winding is also configured such that the number of pole-turns for each parallel path of the winding is not evenly divisible by the number of poles of the winding.

General Configuration of Stator Core With Segmented Conductor Winding

Figure 1:
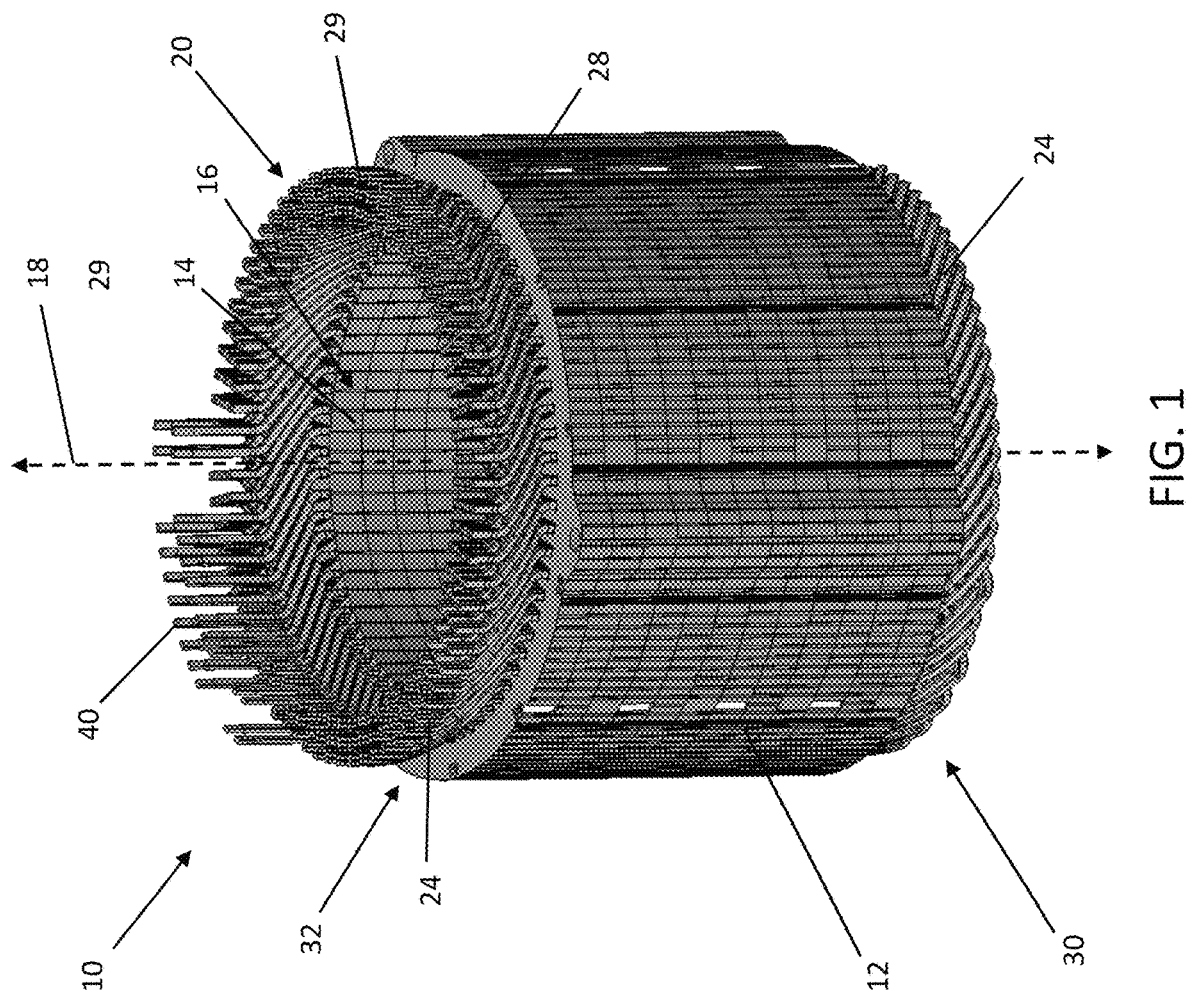
FIG. 1 is a perspective view of weld end of a stator core having a segmented conductor winding arrangement positioned thereon.

FIG. 1 shows a perspective view of the stator 10 for an electric machine, including a stator core 12 with a winding 20 formed on the stator core. The stator core 12 is comprised of a ferromagnetic material and is typically formed from a plurality of steel sheets that are stamped and stacked upon one another to form a lamination stack. The stator core 12 is generally cylindrical in shape as defined by a center axis 18, and includes an inner perimeter surface and an outer perimeter surface. The inner perimeter surface defines an inner diameter (ID) for the stator. The outer perimeter surface defines an outer diameter (OD) for the stator.

A plurality of teeth 14 are formed on the interior of the stator core 12 and directed toward the center axis 18. Each tooth 14 extends radially inward and terminates at the inner perimeter surface. Axial slots 16 are formed in the stator core 12 between the teeth 14. Each slot 16 is defined between two adjacent teeth, such that two adjacent teeth form two opposing radial walls for one slot. The teeth 14 and slots 16 all extend from a first end 30 (i.e., a "crown end") to a second end 32 (i.e., a "connection end" or "weld end") of the core.

Radial openings to the slots 16 are formed along the inner perimeter surface of the stator core 12. When the slots 16 are semi-closed, each radial opening to a slot 16 has a width that is smaller at the inner perimeter surface than at more radially outward positions (i.e., slot positions closer to the outer perimeter surface). In addition to the radial openings to the slots 16 through the inner perimeter surface, axial openings to the slots 16 are also provided the opposite ends 30, 32 of the stator core 12.

As shown in FIG. 1, the stator core 12 is configured to retain the winding arrangement 20 within the slots 16 of the stator core 12. The winding arrangement 20 is formed from a plurality of interconnected coils that are retained within the slots 16. The coils are comprised of interconnected conductor segments that extend through the slots and form paths that generally wrap around the core 12 with a plurality of coils formed upon the core. Each slot 16 is configured to retain some number of in-slot segments in "layers" of the slot, with the in-slot segments typically arranged in single-file manner such that each layer of the slot retains a single conductor segment.

Segmented Conductors for the Winding Arrangement

Figure 2:
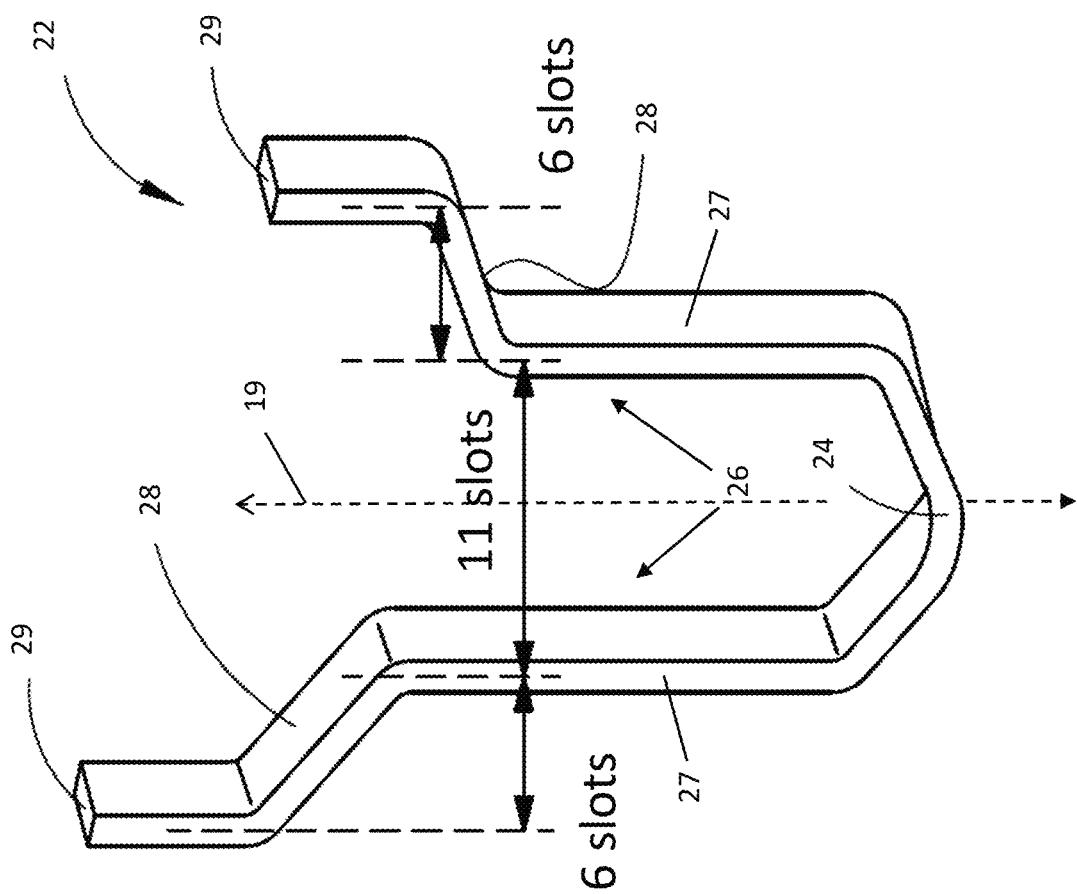
FIG. 2 is a perspective view of an exemplary segmented conductor used to form the winding arrangement of FIG. 1.

With reference now to FIG. 2, an exemplary segmented conductor 22 is shown in isolation from the winding arrangement 20. The segmented conductor 22 is formed of a length of conductive material such as copper. The exemplary segmented conductor shown in FIG. 2 also has a rectangular cross-sectional shape.

Each segmented conductor includes two legs 26 with an end loop 24 connecting the two legs 26. Each leg includes a straight portion 27, a twist portion 28, and a terminal portion 29. The straight portion 27 and the terminal portion 29 both extend in the axial direction. The straight portion 27 is configured to extend axially through one of the slots of the stator core and may also be referred to as an "in-slot portion." The twist portion 28 has axial, circumferential and radial direction components and extends between the straight portion 27 and the terminal portion 29.

The end loop 24 (which may also be referred to as the "end-turn" or "U-turn") of each segmented conductor 22 is arranged on the crown end 30 of the core and defines a 180° change in direction for the segmented conductor, and extends a circumferential distance associated with a number of slots of the stator core. This distance is referred to as the "pitch" (P) of the end loop. An end loop pitch P is defined as the end loop connecting a straight segment in a particular slot number (S) one with a straight segment in slot P+S. For example, an 11 pitch end loop (i.e., P=11) is defined as connecting a straight segment in slot one of the core (i.e., S=1) with a straight segment in slot twelve of the core (i.e., 11+1=12). In the exemplary conductor of FIG. 2, the end loop 24 is shown extending a distance equal to eleven slots of the core (i.e., P=11). Thus, as noted in the example above, if the straight portion 27 of the first leg is positioned in slot one of the core, the straight portion 27 of the second leg is positioned in slot twelve of the core.

Figure 3:
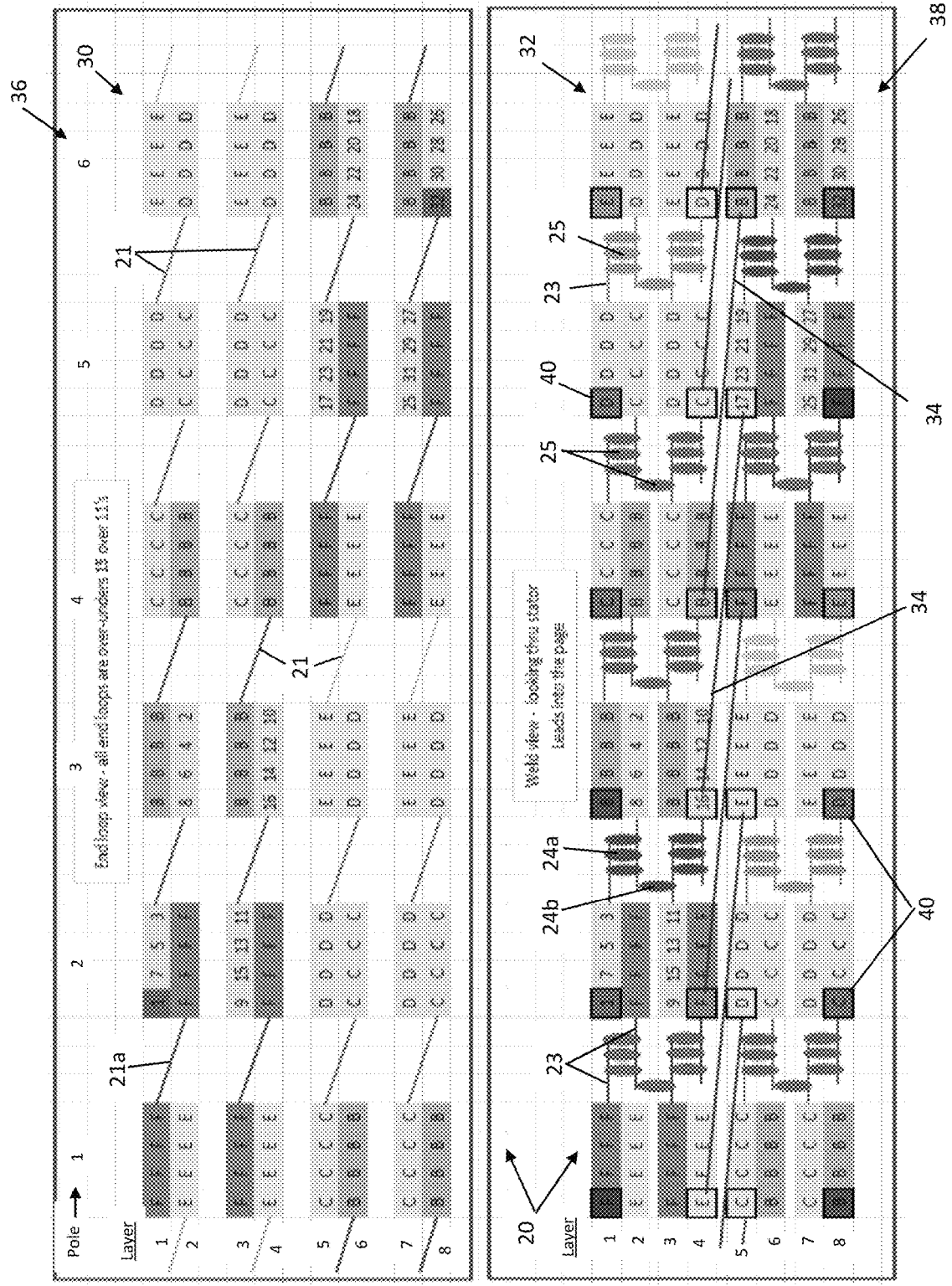
FIG. 3 is a tabular diagram of a segmented conductor winding configured for use in association with the stator of FIG. 1, wherein the number of pole-turn of the winding is not evenly divisible by the number of poles of the winding.

When forming the winding 20, the legs 26 are inserted axially into the slots 16 of the core 12, with all of the end loops 24 arranged on the crown end 30 of the core. For each segmented conductor, one leg is positioned in one layer of a slot, and the other leg is positioned in an adjacent layer of another slot, wherein the two slots are separated by the pitch of the end loop 24 on the crown end 30 of the core 12. Following insertion into the slots, the leg ends extend axially out of the connection end 32 of the stator core. The ends of the legs 26 of each segmented conductor 22 are then bent/twisted in opposite directions such that the twist portion 28 of one leg extends in an opposite circumferential direction from the twist portion 28 of the other leg. This circumferential distance spanned by each twist portion 28 is associated with a number of slots of the stator core 12, and is referred to as the "twist" (T) of the leg 26. In the exemplary conductor of FIG. 2, each leg 26 has a twist of six slots. While the twists are illustrated in FIG. 2 as being in opposite directions away from the center axis 19 of the segmented conductor for the sake of easily showing the twists, it will be recognized that the twists associated with the winding described herein, and particularly the winding of FIG. 3, are actually in opposite directions back toward the center axis 19 of the segmented conductor.

After twisting the legs 26, the terminal portions 29 of different conductors are connected together (e.g., by welding or other connection method) on the connection end 32 of the stator core 12 in order to complete the winding 20. Together, the twists (T) of two segmented conductors connected at their respective terminal portions 29 form an end loop defined by a pitch (P) on the weld end 32 of the stator core. Therefore, it will be recognized that each end loop 24 at the crown end 30 has a pitch defined by the end loop of the associated segmented conductor 22, and each end loop at the weld end 32 has a pitch defined by the two twists (T) of two connected leg ends (i.e., the connected terminal portions 29 of two leg ends).

While FIG. 2 illustrates one exemplary embodiment of a segmented conductor for the winding arrangement 20, it will be recognized that differently shaped conductor segments are also contemplated. For example, the pitch of the end loops 24 and the twist of the leg ends may be different with different segmented conductors used in the winding arrangement 20. As another example, leads 40 to the winding and/or busbar connections may be provided in association with elongated terminal portions 29 that extend past other terminal portions on the weld end 32 of the stator core 12.

Winding Arrangement with Parallel Paths and Quad Sections

With reference now to FIG. 3, a tabular view of a stator winding arrangement 20 is shown, wherein the winding arrangement is formed from a plurality of segmented conductors 22, as described above. As noted in the top two rows of the table of FIG. 3, the winding arrangement 20 includes six poles (as noted by the six slot sets associated with each phase) and is configured for use in a stator core having seventy-two slots. As noted in the leftmost column of FIG. 3, the conductors of the winding (i.e., the straight portions 27 of the conductor legs) are arranged in single-file manner in eight layers (L) in each of the seventy-two slots. In the disclosed embodiment of the winding, layer 1 is an outer layer of each slot and layer 8 is an inner layer of each slot, but it will be recognized that the winding may also be configured in the opposite arrangement wherein layer 1 is the inner layer and layer 8 is the outer layer of the slot.

Only one phase of the winding is illustrated in FIG. 3, and it will be recognized that, for a three phase winding, the two other phases are identical to that shown, but the first additional phase is shifted over four slots, and the second additional phase is shifted over eight slots. Thus, while the tabular view of FIG. 3 only shows three columns/slots between the slot sets of the illustrated phase for the sake of brevity, it will be recognized that eight slots are actually provided between each slot set.

As shown in FIG. 3 each path of the winding includes six parallel paths (i.e., path A, which is illustrated by numerals 1-32 in the slots, and similarly configured paths B, C, D, E and F, as noted in the table). Straight conductor portions for each of paths A-F are arranged in the slots, as shown in FIG. 3. For path A, the path begins in the slot identified by the numeral "1," jumps (via an end turn on the crown end 30) to the next slot identified by the numeral "2," jumps (via an end turn on the connection end 32) to the next slot identified by the numeral "3," and so on until the path ends at the slot identified by the numeral "32." Each of paths B, C, D, E and F also having thirty-two similarly configured conductors arranged in the slots. Leads 40 for each path are illustrated by the bold/darkened black boxes surrounding the associated path. Thus, in the winding of FIG. 3, leads for path A extend from the connection end of the core at the slots where the conductors identified as numerals "1" and "32" are located.

The table of FIG. 3 includes an upper section 36 and a lower section 38 for the purpose of easily illustrating the end loops for the winding. In both the upper section 36 and lower section 38 of the table, the lines extending between the slot sets indicate the general arrangement of the end loops extending between slot sets. The upper section 36 of the table illustrates the end loops 24 on the crown end 30 of the stator core, each of which extends between the two conductors in two different slots of the winding (i.e., each end loop provided by the pre-formed end loop 24 of one of the segmented conductors 22). The lower section 38 of the table illustrates the end loops formed on the connection end 32 of the stator core which extend between conductors in various slots for one phase of the winding (i.e., end loops formed by the twisted leg ends and connections between the terminal portions 29). The lower section 38 is a view from the crown end 30, looking through the stator at the connection end 32. It will be recognized that the term "end loop" as used herein is used to simply indicate an end turn connection between two conductors in different slots. Examples of end loops include an end loop formed by the U-turn portion of a segmented conductors, an end loop formed by the welded ends of the legs of different segmented conductors, or a continuous wire that is bent to form an end loop at one of the ends of the stator core.

In the upper section 36 of the table of FIG. 3, the lines 21 extending between the slots indicate the general arrangement of the end loops 24 on the crown end 30, viewed from the crown end. Each line 21 extending between the slot sets is associated with a set of four end loops on the crown end of the stator. For example, the top line 21a extending between the slot sets associated with poles two and three on the upper section 36 of the table represents four different end loops extending between layers 1 and 2 for the path A conductors. Accordingly, the line 21a represents the following four end loops:

a first end loop having a pitch of fifteen (15) extends between the conductor identified by numeral "1" in the left slot set (i.e., in the slot set associated with pole two) and the conductor identified by numeral "2" in the right slot set (i.e., in the slot set associated with pole three);

a second end loop having a pitch of eleven (11) extends between the conductor identified by the numeral "3" in the left slot set and the conductor identified by the numeral "4" in the right slot set;

a third end loop having a pitch of eleven (11) extends between the conductor identified by the numeral "5" in the left slot set and the conductor identified by the numeral "6" in the right slot set; and a fourth end loop having a pitch of eleven (11) extends between the conductor identified by the numeral "7" in the left slot set and the conductor identified by the numeral "8" in the right slot set.

It will be recognized that each set of four end loops on the crown end 30 (e.g., the end loops associated with line 21a, as noted above) define a set of over-under end loops extending between two poles. In particular, each set of four end loops includes a fifteen (15) pitch end loop that extends over three interleaved eleven (11) pitch end loops.

The lower section 38 of the table of FIG. 3 is similar to the upper section 36, with the lines extending between slot sets indicating the general arrangement of the twists and associated connections between the leg ends in order to form end loops on the weld end 32 of the stator core 12. Each short line 23 extending horizontally from a slot set in the lower section 38 of FIG. 3 represents four different leg ends, each having a twist of six. Each oval 25 in the lower section 38 of FIG. 3 represents one of the connections between two twisted leg ends. Therefore, the set of two lines 23 and three ovals 25 represent three end loops for the path A conductors on the connection end 32 of the stator core 12. For example, between poles two and three, the three end loops include the following:

a first end loop extending between the conductor identified by the numeral "2" in layer 2 of the right slot set and the conductor identified by the numeral "3" in layer 1 of the left slot set;

a second end loop extending between the conductor identified by the numeral "4" in layer 2 of the right slot set and the conductor identified by the numeral "5" in layer 1 of the left slot set; and a third end loop extending between the conductor identified by the numeral "6" in layer 2 of the right slot set and the conductor identified by the numeral "7" in layer 1 of the left slot set.

In addition to the above, the oval 25*a* indicates a special crossover connection between the conductor identified by the numeral "8" in layer 2 of the right slot set and the conductor identified by the numeral "9" in layer 3 of the left slot set.

As shown in FIG. 3, most of the end loops 24 on the connection end 32 of the stator core are regular end turns 24*a*, each of which connects two straight conductor segments within the same layer pair (e.g., the end loop 24 connecting the path A conductor identified by the numeral "2" in layer two to the path A conductor identified by the numeral "3" in layer 1 is a regular end turn with a pitch of twelve). However, in addition to regular end turns 24*a* that extend between conductors in the same layer pair, the end turns on the connection end 32 also include a group of crossover end turns 24*b*, each of which connects a conductor in one layer pair to a conductor in an adjacent layer pair (e.g., the end loop connecting the path A conductor identified by the numeral "8" in layer 2 of the right slot set and the conductor identified by the numeral "9" in layer 3 of the left slot set is a crossover end turn). Two crossover end turns 24*b* are included for each path of each phase. With respect to path A, the crossover end turns include a first crossover end turn extending between poles two and three and connecting conductors in layer 2 to conductors in layer 3, and a second crossover end turn extending between poles five and six and connecting conductors in layer 6 to conductors in layer 7.

In addition to the crossover end turns, the winding also includes one busbar 34 for each path of each phase. Similar to the crossover end turns 24*b*, each busbar 34 provides a connection between conductors in two adjacent layer pairs, and particularly a connection between conductors in layer 4 and conductors in layer 5 for a given path. However, the busbar 34 extends for a significantly greater number of slots than the crossover end turns 24*b* (which have a pitch of twelve). For example, in FIG. 3, the busbar connection for path A extends a total of twenty-four slots from the conductor identified as "16" in layer 4 to the conductor identified as "17" in layer 5, and thus, the busbar 34 extends twice the number of slots as the crossover end turn 24*b*.

The busbars 34 provide connections between layer 4 and layer 5 of the winding which are not conveniently made between two adjacent leg ends. Accordingly, the terminal portions of leg ends connected with a busbar 34 may extend axially past the other terminal portions (e.g., the terminal portion of the conductors identified as "16" and "17" in FIG. 3 may extend axially past the other nearby conductors such as those identified as "14" and "23"). The busbar 34 may be easily connected to these leg ends and routed in a circumferential manner above (i.e., at a position axially outward from) the other leg ends that form the end turns 24 at the connection end 32 of the core 12.

In order to form the winding of FIG. 3, segmented conductors are inserted axially into the slots 16 of the core 12 from the crown end 30. As a result, the pre-formed end turn 24 of each segmented conductor is situated on the crown end 30 with the legs of the segmented conductor extending through two different layers of two different slots of the core, and the leg ends extending axially outward at the connection end 32 of the core. The legs at the connection end of the core are then twisted and adjacent terminal ends 29 of the legs are connected together to form regular end turns 24*a* and crossover end turns 24*b* at the connection end of the core. Thereafter, busbars 34 are connected to the remaining leg ends that are configured to provide the busbar connections between the conductors extending from layer 4 and layer 5.

As noted previously, the winding includes six paths (i.e., paths A, B, C, D and E), and each path is similarly configured to that of path A, but shifted some number of slots on the core. As shown in FIG. 3, path A begins at the lead 40 on the connection end 32 extending from the conductor identified as "1." Conductor "1" extends through the core and on the opposite end (i.e., on the crown end 30), a fifteen pitch over end turn connects conductor "1" to conductor "2." Conductor "2" then extends through the core to the connection end 32, where the leg end of conductor "2" is twisted six slots to the left and is welded to the leg end of conductor "3," which leg end twists six slots to the right, such that a twelve pitch end turn is formed on the connection end between conductor "2" and conductor "3." Then, conductor "3" extends through the core, back to the crown end 30, where it connects to an eleven pitch end loop that connects conductor "3" to conductor "4." This pattern of a twelve pitch end loop on the connection end 32 and an eleven pitch end loop on the crown end 30 is then repeated until reaching conductor "8." It will be recognized that the pattern of conductors "1"-"8" forms a first coil on the stator core with straight conductor portions extending through the slots associated with poles two and three, with end turns 24 extending between the straight portions.

At conductor "8," the leg end twists six slots to the left on the connection end 32 and is welded to the leg end of conductor "9" which twists six slots to the right. This forms a twelve pitch crossover end loop on the connection end extending between layers 2 and 3 (and thus connecting a first layer pair to a second layer pair). The above-described pattern of conductor "1" through conductor "8" is repeated for each of conductors "9" through "16," except the conductors are arranged in layers 3 and 4. Thus, conductors "1"-"8" form a first coil on the stator core, and conductors "9"-"16" form a second coil on the stator core. It will be recognized that both the first coil and the second coil are associated with the same pair of poles (i.e., poles two and three). It will also be recognized that both the first coil and second coil have a plurality of straight portions 27 located in one pole (i.e., pole two) and a plurality of straight portions located in another pole (i.e., pole three).

At conductor "16," a busbar 34 connects conductor "16" in layer 4 to conductor "17" in layer 5 (which conductor "17" is twenty-four slots removed from conductor "16," as described above). The pattern of conductors "1"-"16" is then repeated as conductors "17"-"32," except the conductors are now arranged in layers 5-8 instead of layers 1-4). At conductor "32," the paths completed at a lead 40. It will be recognized that the pattern of conductors "17"-"24" forms a third coil on the stator core, and the pattern of conductors "25"-"32" forms a fourth coil on the stator core. Both of the third coil and the fourth coil are associated with the same pair of poles (i.e., poles five and six). The coils define four different sections for each parallel path, including a first section defined by the first coil, a second section defined by the second coil, a third section defined by the third coil, and a fourth section defined by the fourth coil.

As described herein, the winding arrangement of FIG. 3 is configured as a three-phase, six (6) pole winding having six (6) parallel paths per phase. The winding is arranged on a stator core having seventy-two (72) slots. The winding includes eight (8) conductors per slot with eight layers of conductors in each slot. As such, the conductors are arranged in a single-file manner in each slot. The winding is defined by four (4) slots-per-pole-per-phase (i.e., 72 slots/(6 poles×3 phases)=72/18=4 slots-per-pole-per-phase). The winding is also defined by sixteen pole-turns (PT). The number of pole-turns for a given winding refers to the number of slot segments per parallel path (SS) divided by two (i.e., PT=SS/2), where SS is equal to the number of straight conductor segments extending through the core in each parallel path. Thus, in the example of the winding of FIG. 3, SS=32, as noted by conductors "1"-"32" for path A. Accordingly, the number of pole-turns (per parallel path) is sixteen for the winding of FIG. 3 (i.e., PT=SS/2=32/2=16).

In view of the above, it will be noted that the winding of FIG. 3 is configured such that the number of pole-turns is not evenly divisible by the number of poles. Specifically, the number of pole-turns is sixteen (16) and the number of poles is six (6), so 16/6=2⅔. Therefore, it will be noted that dividing the number of pole turns for each parallel path of the winding by the number of poles returns a mixed number (i.e., a number that is a non-integer such that it includes both a whole number and a proper fraction). This winding arrangement provides a unique configuration wherein the number of pole-turns for each parallel path of the winding is not a whole number, thus providing for a winding with unique and specialized performance characteristics that are not common to other winding arrangements.

While embodiments of the winding arrangement are disclosed herein, it will be recognized that other embodiments are also possible. For example, while the winding arrangements disclosed herein have been described in association with segmented conductors with welded end loops at the connection end, in at least some embodiments, the winding arrangements may be formed with continuous wire segments (e.g., the entire path A for a given phase may be formed with one continuous wire). In this case the different twists may be formed in the end loops by an end loop forming machine. In other embodiments, any number of different winding features may be changed, such as the number of poles of the winding, the number of pole-turns of the winding may be different than sixteen, the number of parallel paths, and the number of slots-per-pole-per-phase.

Although exemplary embodiments of the invention have been disclosed herein, it will be appreciated by those of skill in the art that other implementations and adaptations are possible. Furthermore, aspects of the various embodiments described herein may be combined or substituted with aspects from other features to arrive at different embodiments from those described herein. Thus, it will be appreciated that various of the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by any eventually appended claims.

What is claimed is:

1. A stator for an electric machine comprising:
   a stator core including a plurality of teeth defining a plurality of slots in the stator core; and
   a winding positioned on the stator core, the winding comprising a plurality of segmented conductors connected together to provide a plurality of parallel paths per phase for the winding, each conductor comprising (i) an end loop provided on a crown end of the stator core, (ii) two legs extending through the slots of the stator core, and (iii) two leg ends extending out of the slots on a connection end of the stator core, each leg end having a twist portion;
   wherein the winding defines a number of poles, a number of parallel paths per phase, a number of layers in each of the plurality of slots, and a number of pole-turns per parallel path, wherein the number of pole-turns per parallel path is not evenly divisible by the number of poles.

2. The stator of claim 1 wherein the number of pole-turns per parallel path is sixteen and the number of poles is six.

3. The stator of claim 1 wherein each parallel path defines a plurality of coils on the stator core.

4. The stator of claim 3 wherein the plurality of coils include:
   a first coil and a second coil associated with a first pair of poles, and
   a third coil and a fourth coil associated with a second pair of poles.

5. The stator of claim 4 wherein each of the plurality of coils includes a set of end loops formed by connecting terminal portions of twisted leg ends extending from an associated layer pair on the connection end of the stator core.

6. The stator of claim 5 wherein the first coil and the second coil are connected by crossover end loops on the connection end of the stator core.

7. The stator of claim 6 wherein the second coil and the third coil are connected by a bus bar on the connection end of the stator core, and wherein the third coil and the fourth coil are connected by crossover end loops on the connection end of the stator core.

8. The stator of claim 7 wherein each of the plurality of coils includes a set of over-under end loops on the crown end of the stator core.

9. The stator of claim 8 wherein the over-under end loops include a fifteen-pitch end loop that extends over three interleaved eleven-pitched end loops.

10. An electric machine comprising:
    a stator core including a plurality of teeth defining a number of slots in the stator core; and
    a multi-phase winding positioned on the stator core, wherein the winding includes a plurality of coils and defines a number of conductor layers in each slot, a number of poles, a plurality of parallel paths per phase, and a number of pole-turns for each parallel path,
    wherein the plurality of coils include a first coil and a second coil associated with a first pole and a second pole defining a first pair of poles,
    the first coil including a plurality of straight portions located in the first pole, a plurality of straight portions located in the second pole, and a plurality of regular end loops connecting straight portions in conductor layer one to straight portions in conductor layer two,
    the second coil including a plurality of straight portions located in the first pole, a plurality of straight portions located in the second pole, and a plurality of regular end loops connecting straight portions in conductor layer three to straight portions in conductor layer four, and
    wherein the first coil and the second coil are connected by a crossover end loop.

11. The electric machine of claim 10 wherein the number of pole-turns for each parallel path is sixteen and the number of poles is six.

12. The electric machine of claim 10 wherein the crossover end loop connects a straight portion in conductor layer two to a straight portion in conductor layer three.

13. The electric machine of claim 10 wherein each of the plurality of coils includes a set of over-under end loops on a crown end of the stator core.

14. The electric machine of claim 13 wherein the over-under end loops include a fifteen-pitch end loop that extends over three interleaved eleven-pitched end loops.

15. The electric machine of claim 12 wherein the plurality of coils include:
   a first coil and a second coil associated with a first pair of poles, and
   a third coil and a fourth coil associated with a second pair of poles.

16. The electric machine of claim 15 wherein each of the plurality of coils includes a set of end loops formed by connecting terminal portions of twisted leg ends extending from an associated layer pair on a connection end of the stator core.

17. The electric machine of claim 15 wherein the first coil and the second coil are connected by crossover end loops on a connection end of the stator core, wherein the second coil and the third coil are connected by a bus bar on the connection end of the stator core, and wherein the third coil and the fourth coil are connected by crossover end loops on the connection end of the stator core.

18. The electric machine of claim 10 wherein the winding includes six parallel paths per phase.

19. A stator for an electric machine comprising:
   a stator core including a plurality of teeth defining a number of slots in the stator core; and
   a winding positioned on the stator core, the winding comprising a plurality of conductors connected together to provide a plurality of parallel paths per phase for the winding, each parallel path defining a first coil and a second coil associated with a first pair of poles, and a third coil and a fourth coil associated with a second pair of poles;
   wherein the winding defines a number of poles and a number of pole-turns per parallel path, wherein the number of pole-turns per parallel path is not evenly divisible by the number of poles.

20. The stator of claim 19 wherein the number of pole-turns is sixteen and the number of poles is six.

* * * * *